United States Patent [19]

Tsunoda et al.

[11] 4,408,319
[45] Oct. 4, 1983

[54] OPTICAL INFORMATION RECORDING MOTHER DISC AND METHOD OF PRODUCING THE SAME

[75] Inventors: Taiji Tsunoda; Takashi Nishio; Eiki Tanikawa, all of Saitama, Japan

[73] Assignee: Pioneer Electronic Corporation, Tokyo, Japan

[21] Appl. No.: 273,999

[22] Filed: Jun. 15, 1981

Related U.S. Application Data

[63] Continuation of Ser. No. 56,667, Jul. 11, 1979, abandoned.

[30] Foreign Application Priority Data

Jul. 15, 1978 [JP] Japan .................................. 53-86356
Jul. 15, 1978 [JP] Japan .................................. 53-86357
Jul. 15, 1978 [JP] Japan .................................. 53-86358

[51] Int. Cl.³ .............................................. G11B 7/00
[52] U.S. Cl. .................................. 369/275; 369/284; 346/135.1; 346/137; 264/106
[58] Field of Search .............. 369/275, 276, 283, 284, 369/286, 94, 111, 109; 358/342; 346/762, 135.1, 137; 430/140, 107; 264/106, 107; 425/810

[56] References Cited

U.S. PATENT DOCUMENTS

| | | | |
|---|---|---|---|
| 3,819,315 | 6/1974 | Bouchard | 425/810 |
| 3,842,217 | 10/1974 | Clemers | 369/126 |
| 3,882,214 | 5/1975 | Nosher | 369/276 |
| 3,894,179 | 7/1975 | Jacobs | 369/275 |
| 4,052,738 | 10/1977 | Hosomi | 369/151 |
| 4,155,098 | 5/1979 | Roach | 250/550 |
| 4,164,754 | 8/1979 | Dubois | 369/275 |

*Primary Examiner*—Alan Faber
*Attorney, Agent, or Firm*—Sughrue, Mion, Zinn, Macpeak and Seas

[57] ABSTRACT

An optical information recording disc having pits in a first film formed on one of major surfaces of the disc is uniformly covered with a suitable second film, whereby the size of each pits is corrected. When the disc is to be used as a mother disc for production of replicas, at least the wall of each pit is covered by a third layer having continuously increased thickness towards the bottom of the pit so that a peeling off of an intermediate transfer disc from the mother disc is facilitated.

6 Claims, 5 Drawing Figures

OPTICAL INFORMATION RECORDING MOTHER DISC AND METHOD OF PRODUCING THE SAME

This is a continuation, of application Ser. No. 56,667, filed July 11, 1979, now abandoned.

BACKGROUND OF THE INVENTION

The present invention relates to an information recording disc and a method of producing the same and, particularly, to an information recording disc adapted to record information by irradiating a major surface of the disc with a scannng beam such as laser beam of electron beam and a method of producing the same.

As a recording system of video or audio information on a recording medium in the shape of a disc, there has been proposed an optical system which has been utilized effectively.

The optical recording system utilizes a glass disc substrate on which a photoresist layer having thickness of 1000 to 1500 Å is provided by painting. A laser scanning beam is collimated and directed to the photoresist layer so that a fine spot is formed on the layer. The laser beam is modulated with video or audio information to be recorded so that the photoresist layer is irradiated in the so-called bit-by-bit manner. Thereafter the disc is developed to obtain pits whose length and repetitive rate represent the information. The depth of the pit corresponds to the thickness of the photoresist layer.

In this method, the information on the disc is transferred to a suitable plate of such as plastics from which replicas are produced. Therefore, the thickness of the photoresist on the disc surface must be uniform. Otherwise the S/N ratio of reproduced signal may be highly degraded. However, it is very difficult to provide a uniform photoresist layer by painting over the whole area (diameter being about 300 mm) of the disc.

One conventional method which eliminates the difficulty of providing photoresist layer of uniform thickness is to epitaxially grow a preferentially etachable layer such as silicon oxide layer on one of the major surfaces of the disc and then a chrome layer which is capable of being evaporated by an irradiation of laser beam is formd on the oxide film so that the chrome layer is selectively evaporated according to the laser beam modulated with the information. The oxide layer is etched using the chrome layer thus evaporated selectively as an etching mask until the etching reaches at the substrate and then the mask is removed, resulting in the silicone oxide layer containing the pits corresponding to the information and each having depth corresponding to the thickness of the oxide layer.

In this method, the mentioned difficulty of providing a uniform photoresist layer is overcome because of the nature of the epitaxial growth. However, in either of the methods, there is a tendency of the pit size to increase in comparison with a normal size to be produced and therefore, an exact recording of information may become impossible.

Further, replicas of the disc thus obtained are produced by transferring the pits to a suitable transfer disc of such as plastic and by transferring the pattern on the transfer disc to other discs. Since walls of the pits formed in the silicone oxide layer are substantially orthogonal to the disc surface, the plastic transfer disc for replica which is formed by molding is not easily separated from the mother disc.

SUMMARY OF THE INVENTION

An object of the present invention is to provide an information recording disc by which an exact recording of information is possible.

Another object of the present invention is to provide a mother disc from which a replica is easily separated.

A further object of the invention is to provide a method of producing a mother disc by which an exact recording of information is possible.

Another object of the invention is to provide a method of producing a mother disc from which replicas are easily produced.

DETAILED DESCRIPTION OF THE PREFERRED EMBODIMENT

A disc according to the present invention will be described along with the manufacturing steps shown in the figures.

Figure 1:
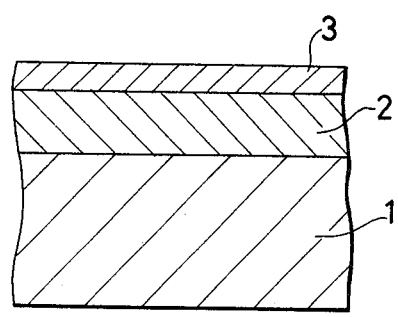
FIGS. 1 through 3 show three of four steps of producing an optical information recording disc according to the present invention, respectively.

In FIG. 1, on one of major surfaces of a substrate or disc 1 of such as glass or plastics, a silicone oxide film 2 of 1000 to 2000 Å thick, for example, is formed by, for example, epitaxial growth. A chrome film 3 is further deposited on the oxide film 2.

Figure 2:
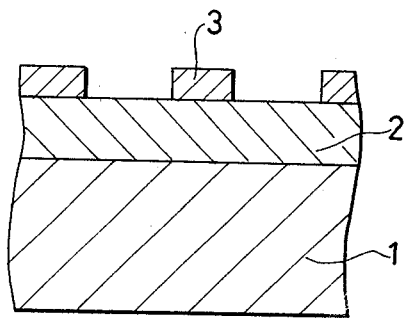

The chrome film 3 is subjected to a laser beam modulated with the information to be recorded and selectively evaporated thereby, as shown in FIG. 2.

Figure 3:
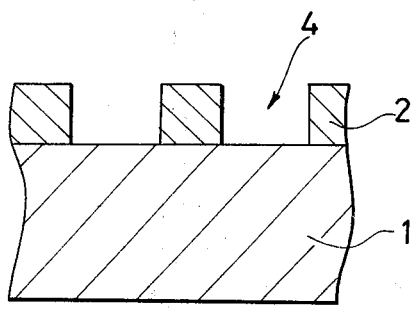

Then, the oxide film 2 is etched by a plasma of, for example, $CF_4$ with using the selectively evaporated chrome film 3 as a mask and the chrome mask 3 is removed as shown in FIG. 3. Thus a disc having the oxide layer 2 in which the pits 4 correcponding to the information are contained is produced.

Since, as mentioned previously, the size of each pit 4 tends to be enlarged, it is necessary to compensate for the enlargement.

Figure 4:
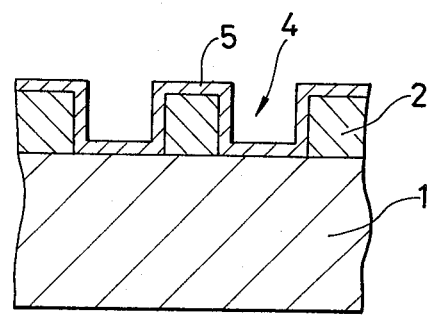
FIG. 4 shows the fourth step of producing the disc.

An example of the compensation for the enlargement is shown in FIG. 4. In this example, a layer 5 of, for example, phosphate glass is epitaxially grown on the whole surface of the disc, as shown in FIG. 4. In this case, the thickness of the phosphate glass layer 5 is desirably substantially uniform throughout the top surface of the oxide film 2, the inside walls of the pits 4 and the exposed area of the substrate 1. Therefore, the epitaxial growth is performed under not the atmospheric pressure but a reduced pressure. The reduced pressure may be at or lower than 10 Torrs.

Since the function of the film 5 is to correct the size of each pits 4, the thickness of the film 5 should be exactly controlled. With the epitaxial growth under the reduced pressure, the precise control of the thickness of the film 5 becomes possible.

Although phosphate glass has been taken as an example of the material for the film 5, it may be possible to use other materials provided that they are capable of being epitaxially grown. For example, resin film or metal film may be used for this purpose.

It may be said that the precisely controlled uniformity of the thickness of the film 5 is necessiated on only the inside walls of the pits 4. However, it is much easier to control the thickness of the film 5 on the whole exposed surfaces than to control the thickness of the film 5 on only the inside walls of the pits 4.

The provision of the uniform film 5 on the whole of the exposed surface of the disc is very effective in correcting the pit size.

As mentioned previously, the inside walls of the pits 4 and, therefore, the films 5 thereon are substantially orthogonal to the surface of the substrate 1. When the disc shown in FIG. 4 is used as a mother disc for production of replicas which are produced by transfer of the pits on the mother disc to other discs through a plastic transfer disc or mold, the vertical inside walls of the pits 4 cause problems in peeling-off the plastic transfer disc from the mother disc.

In order to facilitate the peeling-off of the transfer disc from the mother disc, a suitable layer 6 of a resin, such as polyimide resin in liquid phase is provided on the whole surface of the mother disc by the rotating painting, for example.

Figure 5:
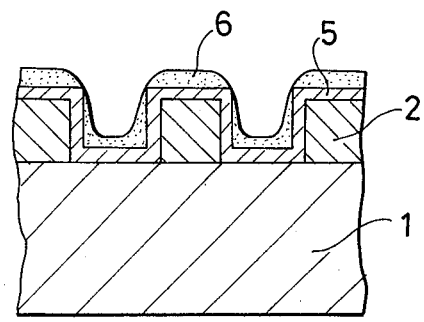
FIG. 5 shows a modification of the fourth step of producing the mother disc.

Since polyimide resin is hardened in the pits 4 in such a way that the bottom corners of the pits are filled therewith to form tapered walls, while leaving the edge portions of the pits as they are as shown in FIG. 5, the difficulty of peeling-off the transfer disc from the pits of the mother disc due to the vertical inside walls of the pits is resolved completely without degrading the pits size correction effect of the film 5. This effect may be equally realized when an electroforming is used to provide an intermediate disc instead of the plastic transfer disc.

In case where the pits are correctly formed and the size correction by the film 5 is unnecessary, the polyimide resin layer 6 may be provided directly to the pits.

Although polyimide resin is described as the material of the layer 6, polyimideamide, cyclic rubber type resin or teflon (DuPont) may be equally used for the purpose.

What is claimed is:

1. An optical information recording mother disc containing a plurality of pits, the length and the repetitive rate of said pits representing information recorded on said disc, said disc comprising:
    a substrate having one major surface;
    a first layer formed on said major surface of said substrate and having a substantially uniform thickness prior to the formation of said pits, said pits being formed on said first layer in response to information, the depth of each of said pits corresponding to the thickness of said first layer, a length of each of said pits being larger than a desired pit length; and
    a second layer having a substantially uniform thickness formed on said first layer having said pits therein so that the depth of said coated pits on said second layer corresponds to the thickness of said first layer and the length of said coated pits corresponds to the desired pit length, said length of said coated pits being controlled by controlling the thickness of said second layer formed on vertical walls of said pits on said first layer.

2. An optical information recording mother disc in claim 1, further comprising a third layer formed on said second layer, said third layer forming tapered pit walls which slant inwardly towards one another at the bottom of each of said pits.

3. An optical information recording mother disc containing a plurality of pits, the length and the repetitive rate of said pits representing information recorded on said disc, said disc comprising:
    a substrate having one major surface;
    a first layer formed on said major surface of said substrate and having said pits formed on said first layer in response to said information, a depth of each of said pits corresponding to a thickness of said first layer; and
    a second layer formed on said pits, said second layer forming tapered pit walls which slant inwardly towards one another at the bottom of each of said pits to facilitate the forming of replicas of said optical information recording mother disc by transferring said pits to said replicas.

4. A method of producing an optical information recording mother disc containing a plurality of pits, the length and the repetitive rate of said pits representing information recorded on said disc, comprising the steps of:
    forming a first layer on one major surface of a substrate disc, said first layer having a substantially uniform thickness;
    forming said plurality of pits in said first layer in response to said information to a depth corresponding to said thickness of said first layer and to a length larger than a desired pit length;
    controlling, by epitaxially growing a second layer on said first layer under a reduced pressure to a substantially uniform thickness, the length and the depth of said pits so that the length of said pits on said second layer corresponds to said desired pit length and the depth of said pits on said second layer corresponds to said thickness of said first layer.

5. A method of producing an optical information recording mother disc in claim 4, further comprising the steps of providing a liquid film on said second layer and then hardening said liquid film so that a third layer having continuously increased thickness towards the bottom of each of said pits is formed on said second layer.

6. A method of producing an optical information recording mother disc containing a plurality of pits, the length and the repetitive rate of said pits representing information recorded on said disc, comprising the steps of forming pits in a first layer formed on one major surface of a substrate disc in response to information, each of said pits extending throughout the thickness of said first layer and having vertical walls, providing a liquid film on said first layer and then hardening said liquid film so that a second layer having continuously increased thickness towards the bottom of each of said pits is formed on said first layer to thereby facilitate the forming of replicas of said optical information recording mother disc by transferring said pits to said replicas.

* * * * *